US008434007B2

(12) United States Patent
Morita

(10) Patent No.: US 8,434,007 B2
(45) Date of Patent: Apr. 30, 2013

(54) MULTIMEDIA REPRODUCTION APPARATUS, MENU SCREEN DISPLAY METHOD, MENU SCREEN DISPLAY PROGRAM, AND COMPUTER READABLE RECORDING MEDIUM RECORDED WITH MENU SCREEN DISPLAY PROGRAM

(75) Inventor: Toru Morita, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 394 days.

(21) Appl. No.: 12/599,053

(22) PCT Filed: May 8, 2007

(86) PCT No.: PCT/JP2007/059531
§ 371 (c)(1),
(2), (4) Date: Aug. 5, 2010

(87) PCT Pub. No.: WO2008/139571
PCT Pub. Date: Nov. 20, 2008

(65) Prior Publication Data
US 2010/0299606 A1      Nov. 25, 2010

(51) Int. Cl.
*G06F 13/00* (2006.01)
*G06F 15/00* (2006.01)

(52) U.S. Cl.
USPC .......................................... 715/738; 715/835

(58) Field of Classification Search .................. 715/738,
715/835, 736, 737, 734, 756, 764
See application file for complete search history.

(56) References Cited

U.S. PATENT DOCUMENTS

| 2006/0020970 A1* | 1/2006 | Utsuki et al. ..................... 725/39 |
| 2007/0101364 A1 | 5/2007 | Morita |
| 2007/0266411 A1* | 11/2007 | Yamamoto et al. ............. 725/88 |
| 2008/0141172 A1* | 6/2008 | Yamamoto et al. ........... 715/835 |

FOREIGN PATENT DOCUMENTS

| JP | 2004170753 A | * | 6/2004 |
| JP | 2004181724 A | * | 7/2004 |
| JP | 2004205127 A | * | 7/2004 |
| JP | 2004356774 | | 12/2004 |
| JP | 2005045719 | | 2/2005 |
| JP | 2005354245 A | | 12/2005 |
| JP | 2006004292 | | 1/2006 |
| JP | 2006031115 | | 2/2006 |

OTHER PUBLICATIONS

International Search Report dated Aug. 14, 2007 from the corresponding PCT/JP2007/059531.

* cited by examiner

*Primary Examiner* — Cao "Kevin" Nguyen
(74) *Attorney, Agent, or Firm* — Katten Muchin Rosenman LLP

(57) ABSTRACT

A functional icon array 70 made up of multiple functional icons indicating types of reproduction functions, and a content icon array 72 made up of multiple content icons indicating items for reproducible contents are displayed on a menu screen 50. In the case where a functional icon to be displayed in an intersection region 76 in which the functional icon array 70 and the content icon array 72 intersect is a network icon 63, the content icons are hierarchically displayed according to an XML file acquired via the Internet. A content icon 641A, which indicates a content classification, and content icons 643A, 643B, 643C, and 643D, which indicate more classifications belonging to the classification indicated by the content icon 641A, are hierarchically displayed.

11 Claims, 10 Drawing Sheets

US 8,434,007 B2

MULTIMEDIA REPRODUCTION APPARATUS, MENU SCREEN DISPLAY METHOD, MENU SCREEN DISPLAY PROGRAM, AND COMPUTER READABLE RECORDING MEDIUM RECORDED WITH MENU SCREEN DISPLAY PROGRAM

TECHNICAL FIELD

The present invention relates to a multimedia reproduction apparatus and a menu screen display method. It particularly relates to technology of a user interface for instructing multimedia reproduction.

BACKGROUND ART

Conventionally, there is a multimedia reproduction apparatus, which displays a menu screen with multiple function icons symbolizing types of content reproduction functions and multiple content icons symbolizing content items in a two-dimensional array, as given in Patent Document 1, for example. Content is information content including video, static images, audio, text, and programs. Content reproduction functions are reproduction, display or execution of contents acquired by multiple types of information transmission means such as a hard disk, an optical disk, a memory card, a broadcast line, and a network. With such menu screen, a user may directly grasp what kind of content is selectable from the multiple types of reproduction functions, and may easily select a desired content.

[Patent Document 1] Japanese Unexamined Patent Application Publication No 2004-356774

DISCLOSURE OF INVENTION

Problem to be Solved by the Invention

Such multimedia reproduction apparatus includes those that are capable of conducting data communication with other various external devices via the Internet. With such multimedia reproduction apparatus, it can be considered that taking advantage of the benefits of an Internet connection and improving user convenience will be in demand.

Therefore, the present invention is devised through consideration of the problem. An objective thereof is to increase user convenience with a multimedia reproduction apparatus connectable to the Internet.

Means of Solving the Problem

A multimedia reproduction apparatus according an aspect of to the present invention, which is capable of reproducing contents, includes an operation unit, which receives a command regarding content reproduction via an operation by a user; a storage unit, which is stored with data of a plurality of functional icons symbolizing types of content reproduction functions, a content to be reproduced by the apparatus, and data of a plurality of content icons symbolizing items for contents; a network control unit, which accesses an external device via a network to acquire from the external device, content classification information indicating classifications of contents to be reproduced and items for the classified contents; a display output unit, which outputs image data of a menu screen related to reproduction of the content to a display device, and reproduces the content acquired from either the storage unit or the network control unit in conformity with a command from the user received by the operation unit; and a display control unit, which generates image data of the menu screen with a two-dimensional array including a first array in which the plurality of functional icons is lined up in a specified direction on a screen, and a second array in which the plurality of content icons are lined up in a direction intersecting the first array on the screen. When of the plurality of reproduction functions, a reproduction function of a content acquired from the external device has been selected in conformity with a command from the user received by the operation unit, the display control unit analyzes the content classification information acquired by the network control unit via the network, classifies the content acquired from the external device, displays a content classification icon symbolizing that classification as the content icon on the menu screen, while when the content classification icon is selected in conformity with a command from the user received by the operation unit, the display control unit displays the content icon symbolizing a content item belonging to that classification on the menu screen.

Note that 'content' refers to information content including video, static images, audio, text, and programs to be reproduced, displayed, or executed through multiple types media for communication, and may specifically include entertainment information. Also note that as the term 'content' abstractly indicates all reproduction targets, 'content item' may indicate each individual data file such as video data, static image data, audio data, text data, program data, or similar types of data as contents. Moreover, 'acquisition of a content item' may indicate the operation of acquiring data such as a list of content names or a list of file names as 'a content item'. 'Reproduction' may indicate reproduction of an image or voice, or execution of a program. 'External device' may be an information processing apparatus similar to this aspect, having a content storage function, a content reproduction function, a network communication function, and other similar functions.

According to this multimedia reproduction apparatus, by acquiring content classification information, which indicates classifications of contents stored in an external device and items of classified contents, the contents stored in the external device may be classified, and the content classifications may be represented on a menu screen. This allows the user to easily select a desired content from various contents. Therefore, even if the storage place of the content is in another apparatus on the network, provision of a realistically user-friendly user interface is possible.

Alternatively, a multimedia reproduction apparatus according to another aspect of the present invention, which is capable of reproducing contents, includes an operation unit, which receives a command regarding content reproduction via an operation by a user; a storage unit, which is stored with data of a plurality of functional icons symbolizing types of content reproduction functions, contents to be reproduced by the apparatus, and data of a plurality of content icons symbolizing content items; a network control unit, which access an external device via a network to acquire from the external device content related information involving content to be reproduced; a display output unit, which outputs image data of a menu screen related to reproduction of the content to a display device, and reproduces the content acquired from the storage unit in conformity with a command from the user received by the operation unit; and a display control unit, which generates image data of the menu screen with a two-dimensional array including a first array in which the plurality of functional icons is lined up in a specified direction on a screen, and a second array in which the plurality of content icons are lined up in a direction intersecting the first array on the screen. When any one of the plurality of content icons has been selected in conformity with a command from the user received by the operation unit, the display control unit displays the content icon symbolizing a content item acquired from the storage unit and content related information regarding the content acquired by the network control unit on the menu screen.

Note that content related information regarding content may represent content of the content, level of recommendation of the content, content introducing other content related to said content, or an arbitrary comment by the user regarding the content.

This multimedia reproduction apparatus allows acquisition of content related information regarding contents via a network, and improvement in user-friendliness when selecting contents.

Result of Invention

According to the present invention, user convenience during multimedia reproduction may be increased.

DESCRIPTION OF REFERENCE NUMERALS

Figure 1:
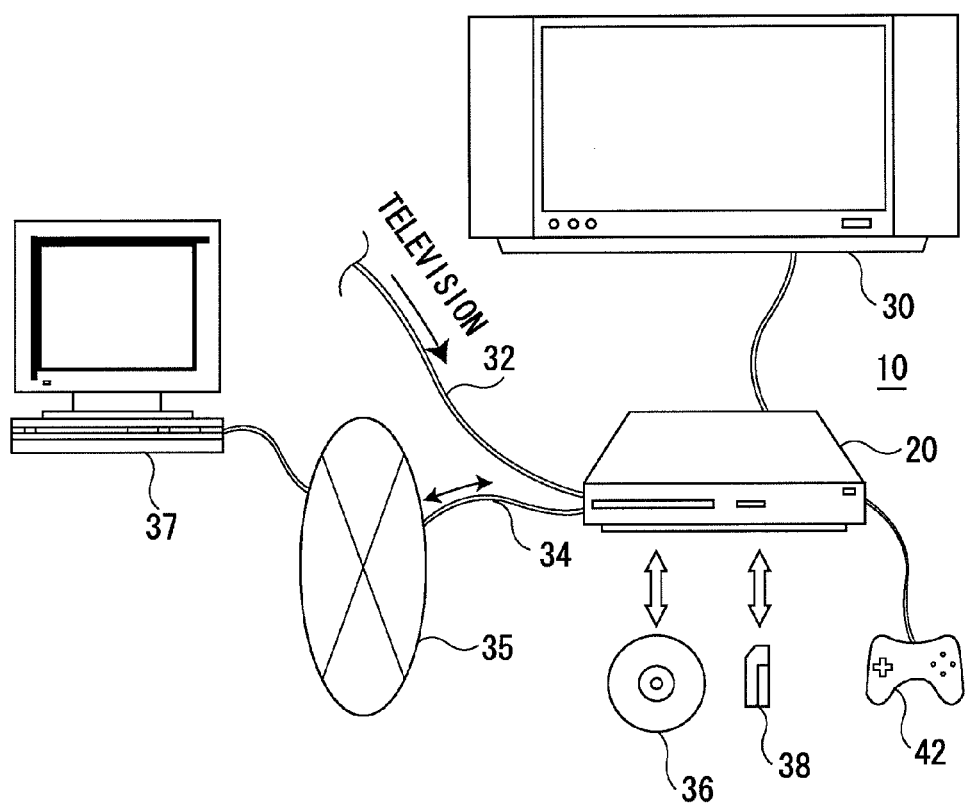
FIG. 1 is a diagram showing a basic structure of a multimedia reproduction system according to an embodiment of the present invention.

20: multimedia reproduction apparatus
30: television receiver
37: information server
40: operation unit
42: controller
46: display output unit
48: display control unit
50: menu screen
80: storage unit
86: network control unit

BEST MODE FOR CARRYING OUT THE INVENTION

Embodiments according to the present invention are described below with reference to the accompanying drawings. Note that the same parts are designated by the same symbol in the drawings. In addition, the embodiments merely show aspects of the present invention, and may be arbitrarily modified within the scope of the present invention.

Embodiment (1) Structure

<Structure of Multimedia Reproduction Apparatus 20>

A multimedia reproduction system according to an embodiment of the present invention is an integrated apparatus capable of reproducing or executing multiple contents such as static images, video, music, broadcasts, and games. A television receiver screen is used as a display screen, and display contents on the screen and operation buttons of a controller are used as operating means. If the multiple contents are reproduced with a personal computer, use of individual programs such as a viewer corresponding to the types of contents is required. These individual programs are produced by different venders, and there is generally no unity among the respective operation methods thereof without having a common interface. Even if they are integrated into a common interface such as a so-called portal screen, it is merely a combination and time is required for activation of each program. Therefore, ease in operation of program switching is unattainable.

The multimedia reproduction system according to this embodiment of the present invention provides unity for reproduction of multiple contents under a common interface, and common operability for users. Moreover, user convenience will increase through provision of an interface implementing visibility and simple operability appealing to the perceptions of the users so as to easily instruct reproduction of desired content regardless of stored location of the contents in the network.

FIG. 1 is a diagram showing a basic structure of a multimedia reproduction system. A multimedia reproduction system 10 functions with a multimedia reproduction apparatus 20 as a core element. A television receiver 30 and a controller 42 are connected to the multimedia reproduction apparatus 20. The television receiver 30 has a function of displaying or outputting images or voice output from the multimedia reproduction apparatus 20, and is externally connected to the multimedia reproduction apparatus 20. The controller 42 is a device receiving various commands regarding content reproduction through manipulation by a user, and functions as a part of the multimedia reproduction system 10. This controller 42 may be implemented by a game controller as displayed in the drawings, or by a remote controller used for controlling various functions of the multimedia reproduction apparatus 20.

Data is input to the multimedia reproduction apparatus 20 via various recording media or various cables. For example, data such as an image or audio of a program or broadcast contents is input to the multimedia reproduction apparatus 20 via an antenna cable 32. The broadcast contents may be recorded by the multimedia reproduction apparatus 20, or output to the television receiver 30 after image processing by the multimedia reproduction apparatus 20.

Moreover, various contents or XML files described later are input to the multimedia reproduction apparatus 20 from an external apparatus (here, it is an information distribution server 37) connected to the Internet 35 via a network cable 34 or a modem omitted from the drawings. The input contents are stored or buffered and then reproduced by the multimedia reproduction apparatus 20.

The multimedia reproduction apparatus 20 displays on the television receiver 30 a menu screen for instructing content reproduction. In this menu screen, items for the contents stored in the multimedia reproduction apparatus 20 or items for the contents acquired from the information server 37 are displayed, allowing the multimedia reproduction apparatus 20 to reproduce various contents in conformity with user's commands.

The multimedia reproduction apparatus 20 has a data read function and a data write function for an optical disk 36 such as a DVD or CD, and a data read function and a data write function for a removable memory card 38. The multimedia reproduction apparatus 20 may read out data such as an image or a music album from the optical disk 36, or read out data such as a photographed image or a filmed image from the memory card 38.

Figure 2:
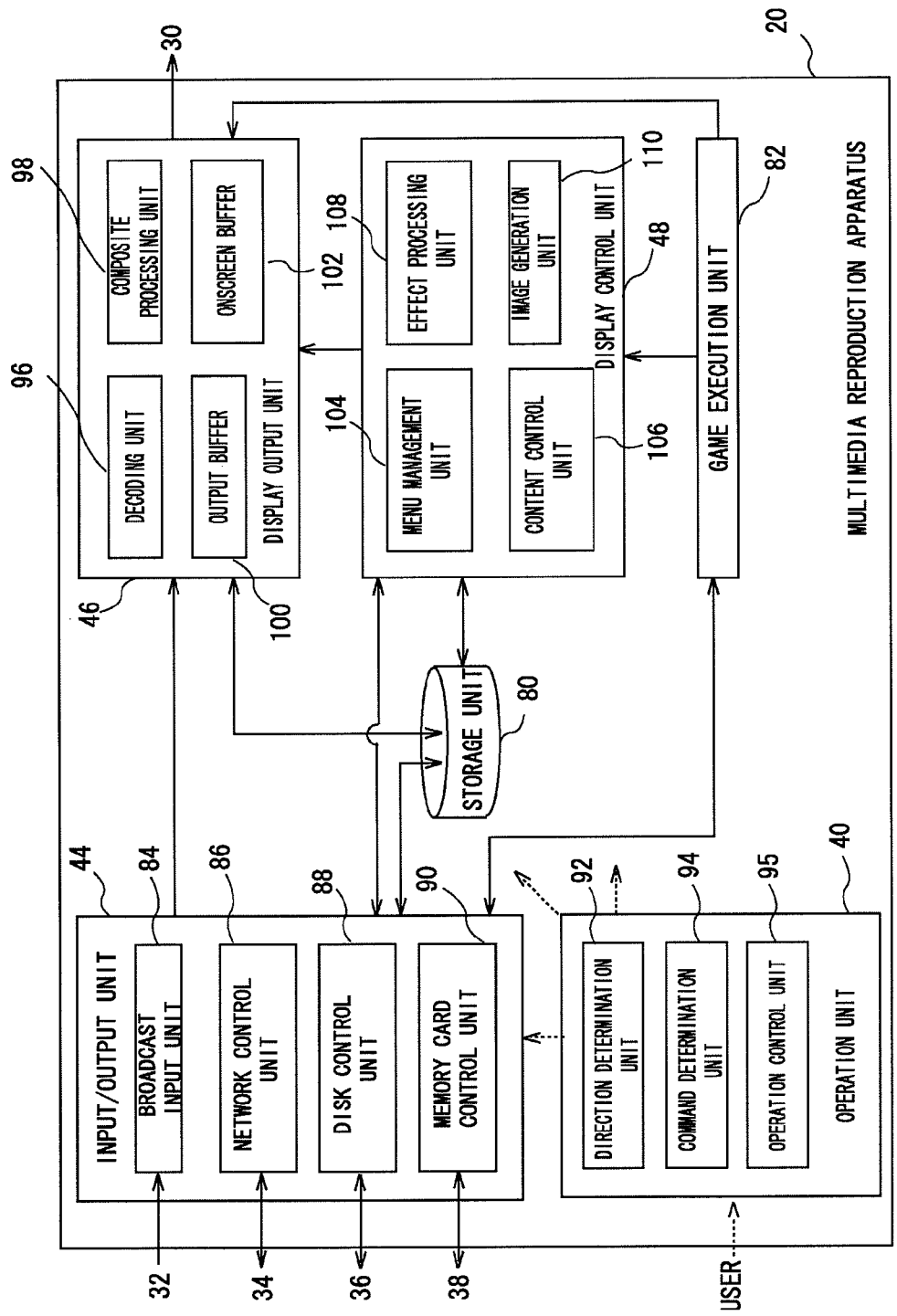
FIG. 2 is a functional block diagram showing a structure of a multimedia reproduction apparatus according to this embodiment.

FIG. 2 is a functional block diagram showing a structure of the multimedia reproduction apparatus 20. The multimedia reproduction apparatus 20 includes an operation unit 40, an input/output unit 44, a display output unit 46, a display control unit 48, a storage unit 80, and a game execution unit 82. The multimedia reproduction apparatus 20 may be constituted in hardware by CPU, hard disk, RAM, ROM, a drawing circuit etc., and may implement software programs for data input, data holding, image processing, drawing etc.; FIG. 2 shows functional blocks implemented by coordination thereof. Therefore, these functional blocks may be implemented in various forms by combining hardware and software.

The operation unit 40 includes a direction determination unit 92, which acquires a command regarding any one of four directions: up, down, left, and right, via manipulation of the controller 42 by the user, a command determination unit 94, which acquires commands such as content reproduction, reproduction stop, menu screen call up via manipulation of the controller by the user, and an operation control unit 95, which controls the input/output unit 44, the display output unit 46, the display control unit 48, and the game execution unit 82 in conformity with the commands acquired by the direction determination unit 92 and the command determination unit 94.

The input/output unit 44 includes a broadcast input unit 84, which inputs broadcast content via the antenna cable 32; a network control unit 86, which processes various data input and various data output held by an external device such as the information server 37 and related devices via the network cable 34 and the modem omitted from the drawings; a disk control unit 88, which controls input of data stored in the optical disk 36 and data write-in to the optical disk 36; and a memory card control unit 90, which inputs and outputs data to and from the memory card 38. The network control unit 86 controls data communication with the external device via the Internet 35. The network control unit 86 also acquires from the external device various pieces of information, such as network information including an IP address, MAC address etc., device name and ID, category ID of stored content, and content information including thumbnails, name, data size etc., and stores them in the storage unit 80. The data input by the input/output unit 44 via each unit is sent to the display output unit 46, the display control unit 48, the storage unit 80, and the game execution unit 82.

Broadcast contents input via the antenna cable 32, XML files and contents input from the external device via the network cable 34, contents such as music and movies read from the optical disk 36, and contents such as static images and video are stored in the storage unit 80. Data of multiple functional icons symbolizing categories of reproduction functions, content reproduced by the display output unit 46 and content executed by the game execution unit 82, data of content icons symbolizing types of multiple contents or multiple content icons symbolizing an item for each content stored in the storage unit 80 are also stored in the storage unit 80. Moreover, the content icons stored in the external device, the optical disk 36, and the memory card 38 are acquired from the information server 37, the optical disk 36, and the memory card 38 by the network control unit 86, the disk control unit 88, and the memory card control unit 90, and then stored in the storage unit 80. These functional icons and content icons are used for display of items on the menu screen.

The display output unit 46 includes a decoding unit 96, which decodes coded data, an output buffer 100, which temporarily stores reproduction data to be output to the television receiver 30 before it is output, an onscreen buffer 102, which temporarily stores image data for onscreen display to be output to the television receiver 30 before it is output, and a composite processing unit 98, which composites reproduction data and image data. The decoding unit 96 decodes coded reproduction data such as broadcast contents, movies, and music received from the input/output unit 44 or the storage unit 80 in conformity with a user's command received by the operation unit 40, and stores them in the output buffer 100. Menu screen image data generated by the display control unit 48, for example, is stored in the onscreen buffer 102 as image data for onscreen display. The composite processing unit 98 composites the reproduction data stored in the output buffer 100 and the menu screen image data stored in the onscreen buffer 102, converts them to analog signals and outputs them to the television receiver 30.

The display control unit 48 includes a menu management unit 104, which manages types of reproduction functions and items of contents corresponding to the respective reproduction functions as menu items; a content control unit 106, which controls reproduction or execution of each content; an effect processing unit 108, which processes for icons on the menu screen; and an image generation unit 110, which generates menu screen image data. The menu management unit 104 stores items of contents stored in the storage unit 80 and item of contents input via the input/output unit 44, and stores the types of reproduction function and contents currently being selected. Reproduction functions referred to here include, for example, static image reproduction, music reproduction, video reproduction, broadcast display, game execution, various setting, and network selection. The content control unit 106 controls switch-over of reproduction functions, start and stop of content reproduction, data input by the input/output unit 44, data read-out from the control unit 80, and processing by the game execution unit 82 in conformity with a user's command acquired by the operation unit 40.

The image generation unit 110 generates a menu screen constituted by an array of the multiple functional icons lined up horizontally and an array of the multiple content icons lined up vertically. These two arrays cross near the center of the screen to form a cross array, and highlights them so that the image generation unit 110 can visually differentiate between the functional icons and the content icons displayed at the crossing position and its vicinity. The effect processing unit 108 displays the array of functional icons and the array of content icons in a scrollable manner, and highlights the functional icon and the content icon of interest. Highlighting of the icon is expressed with, for example, a different color than other icons and change thereof, or with a different form than other icons such as enlargement of the icon or movement to change to that enlarged state.

The game execution unit 82 executes a game program read out from the optical disk 36 by the disk control unit 88 or game program read out from the storage unit 80. The game execution unit 82 also executes the game program in conformity with a user's command received from the operation unit 40, and sends images and audio of the game to the display output unit 46.

Figure 3:
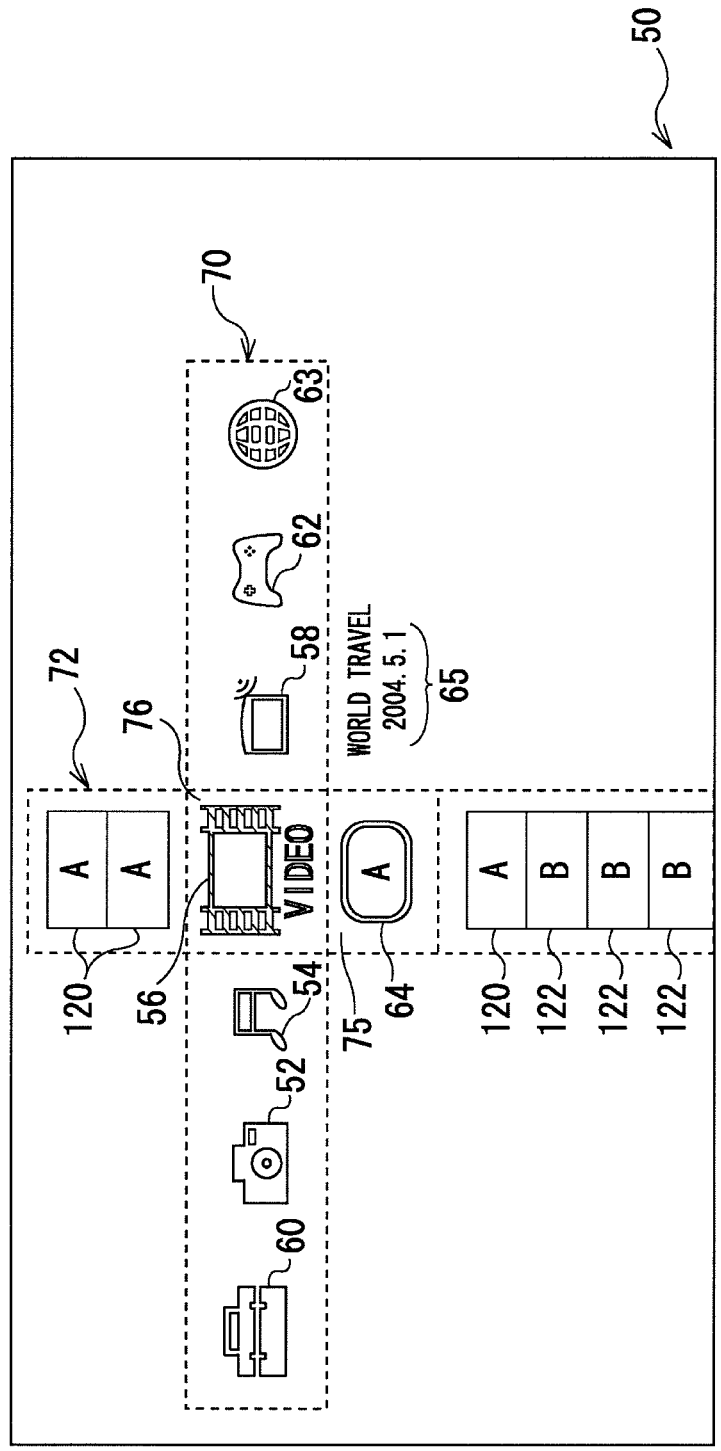
FIG. 3 is a diagram showing a structure of a menu screen generated by the multimedia reproduction apparatus according to this embodiment.

FIG. 3 is a diagram showing a structure of a menu screen generated by the multimedia reproduction apparatus 20. A two-dimensional array in which a functional icon array 70 made up of multiple functional icons horizontally lined up crosses a content icon array 72 made up of multiple content icons vertically lined up is displayed on a menu screen 50. The functional icon array 70 includes a photo icon 52, a music icon 54, a video icon 56, a broadcast icon 58, a game icon 62, a setting icon 60, and a network icon 63 as marks indicating types of reproduction functions of the multimedia reproduction unit 20. The content icon array 72 includes icons such as thumbnails for the multiple contents stored in the storage unit 80, and icons symbolizing categories of the multiple contents. The menu screen 50 constituted by the functional icon array 70 and the content icon array 72 is an onscreen display and is superimposed on a content image. When displaying the content image that is currently being reproduced in a background area (omitted from the drawing), the effect processing unit 108 may apply color for facilitating distinction of appearance from the background area across the entire area of the functional icon array 70 and the content icon array 72, and may facilitate distinction of appearance using a method such as adjusting brightness of the content image.

The functional icon, which is positioned in a region including the intersection of the functional icon array 70 and the content icon array 72, is displayed enlarged in a different color than that of the other functional icons as shown in the drawing. With the position of an intersecting region 76 being stationary at approximately the center of the menu screen 50, the entire functional icon array 70 is moved left or right in conformity with a left or right directional command from the user via the operation unit 40, and color and size of the functional icon positioned in the intersecting region 76 is changed. Therefore, a desired reproduction function can be selected by the user just by giving a left or right directional command, and a determination command such as a click operation of a mouse normally performed on a PC, for example, is unnecessary.

The effect processing unit 108 moves a function icon left or right by scrolling left or right across the entire region of the functional icon array 70. Although the effect processing unit 108 displays each of the functional icons with the same color and size while moving them left or right, it changes the color and size of only the functional icon positioned in the intersection region 76. The effect processing unit 108 may change features such as brightness, color saturation and hue of the functional icons as change in color, or may change color by blinking. In this manner, the user may easily select a content since the functional icon positioned in the intersection region 76 is displayed with different display aspects than the other functional icons.

The effect processing unit 108 does not display the content icon array 72 when none of the functional icons are positioned in the intersection region 76 while moving a functional icon left or right, and when any one of the functional icons is positioned in the intersection region 76, expands and displays so as to draw out the content icon array 72 up or down from the intersection region 76. The user may recognize content corresponding to that reproduction function by merely scrolling the function icon left or right to reach the intersection region 76 as a target point, and may recognize the type of reproduction function from the content being expanded and displayed. On the other hand, when there is a left or right directional command while the content icon array 72 is displayed, the effect processing unit 108 displays the expanded content icon array 72 as moving toward the intersection region 76 so as to be stored.

A target region 75 position approximately at the center of the menu screen 50 is a region in which an icon for content to be manipulated by the user should be displayed, and position thereof should be approximately at the center of the menu screen 50. The image generation unit 110 displays the functional icon array 70 so that the intersection region 76 is positioned near the target region 75, namely directly above the target region 75. The target region 75 constitutes a part of the content icon array 72, and the effect processing unit 108 enlarges and displays the content icon positioned within the target region 75 as a target icon 64. The other content icons are displayed smaller than the target icon 64. Content information 65 such as video title or recording date, for example, are displayed positioned near the target icon 64, namely to the right as a content attribute indicating the target icon 64.

While the operation unit 40 is receiving the up or down directional command from the user, the respective content icons are moved up or down in accordance with that command. The effect processing unit 108 moves a content icon left or right by scrolling left or right across the entire region of the content icon array 72.

Although the effect processing unit 108 displays each of the content icons with the same color and size while moving them left or right, it enlarges the size of only the content icon positioned in the target region 75 as the target icon 64. The effect processing unit 108 may also change features such as brightness, color saturation and hue of the target icon 64, or may display it in a blinking manner. If the operation unit 40 acquires from the user a command for reproduction determination of the displayed content as the target icon 64, the image generation unit sets the image data of the menu screen to non-display, and the content control unit 106 starts and controls reproduction of the selected content. If the user gives a command to call up the menu screen via the operation unit 40 during content reproduction, the menu screen is superimposed on the screen of the content being reproduced. Here, the state where reproduction of the content has been determined is reproduced on the menu screen.

The image generation unit 110 displays the functional icon array 70 slightly above the center in the vertical direction of the menu screen 50, and displays the content icon array 72 slightly to the left of the center in the horizontal direction of the menu screen 50. As a result, combination of the target icon 64 and the content information 65 is displayed approximately at the center of the menu screen 50. The user can see the target icon 64 and the content information 65 at the center of the menu screen 50 and easily recognize the contents thereof.

The photo icon 52 symbolizes a static image reproduction function, and is an icon to be selected in the case of reproducing a static image. The image to be reproduced is a static image primarily photographed with a digital camera, and is read in from the memory card 38, for example. The content icon expanded and displayed when the photo icon 52 is positioned in the intersection region 76 is a thumbnail of the static image. Photographic information such as photographing date and file size is displayed as the content information 65.

The music icon 54 symbolizes a music reproduction function, and is to be selected in the case of reproducing music data. Music data to be reproduced is generated by encoding data read in from the optical disk 36, for example, in a specified compression format. A content icon to be expanded and displayed when the music icon 54 is positioned in the intersection region 76 may be displayed in a song unit or an album unit. Information such as title of a song or album and reproduction time is displayed as the content information 65. The music data may include video data such as a promotion video for a song, and in that case, a thumbnail for that video may be used as the content icon.

The video icon 56 symbolizes a video reproduction function, and is an icon to be selected in the case of reproducing a video image. The video image to be reproduced is recorded video of a television program input from the antenna cable 32, recorded video taken with a digital video camera, or video read from the optical disk 36 or an external device, and is encoded in a specified compression format. In these cases, a thumbnail of a miniature frame including the video image is used as the content icon. Information such as photographing date and reproduction time is displayed as the content information 65.

The broadcast icon 58 symbolizes a broadcast display function, and is to be selected in the case of watching a television program input from the antenna cable 32. A content icon to be expanded as a viewer's target may be displayed in a program unit, broadcast station unit, or broadcast channel unit. Information such as broadcast station name, broadcast channel name, program title, and broadcast time acquired from electronic program guide (EPG) data is displayed as the content information 65.

The game icon 62 symbolizes a game execution function, and is an icon to be selected in the case of executing a game program. The target for execution is a game program stored in the storage unit 80 or read in from the optical disk 36. When the game program includes a game icon as data, that icon is displayed as a content icon. Information such as game program title is displayed as the content information 65.

The setting icon 60 symbolizes various types of setting functions, and is an icon to be selected in the case of changing various types of settings of the multimedia reproduction apparatus 20.

The network icon 63 symbolizes a network selection function, and is to be selected in the case of reproducing content to be input via the Internet 35. Here, the content icon expanded as a target for reproduction is defined by an XML file (hereafter referred to as device XML file) stored in the storage unit 80. In this device XML file, a uniform resource locator (URL) representing the storage place of an XML file (hereafter referred to as other device XML file) stored in an external device such as the information server 37 connected to the Internet 35 is described. In the other device XML file, a classification structure of contents, which are stored in the information server 37 and classified hierarchically according to types of the contents, is described in a tree structure, for example. Classification name indicating classification of the contents is provided in the upper layer of the tree structure. Item names of respective contents included in respective folders and URLs storing the contents are provided in the lowest layer of the tree structure. The contents are static images, video images, music data, games, and the like. Note that the hierarchy structure of the contents described in the XML file may have two or more layers, or may merely be a single layer.

Figure 4:
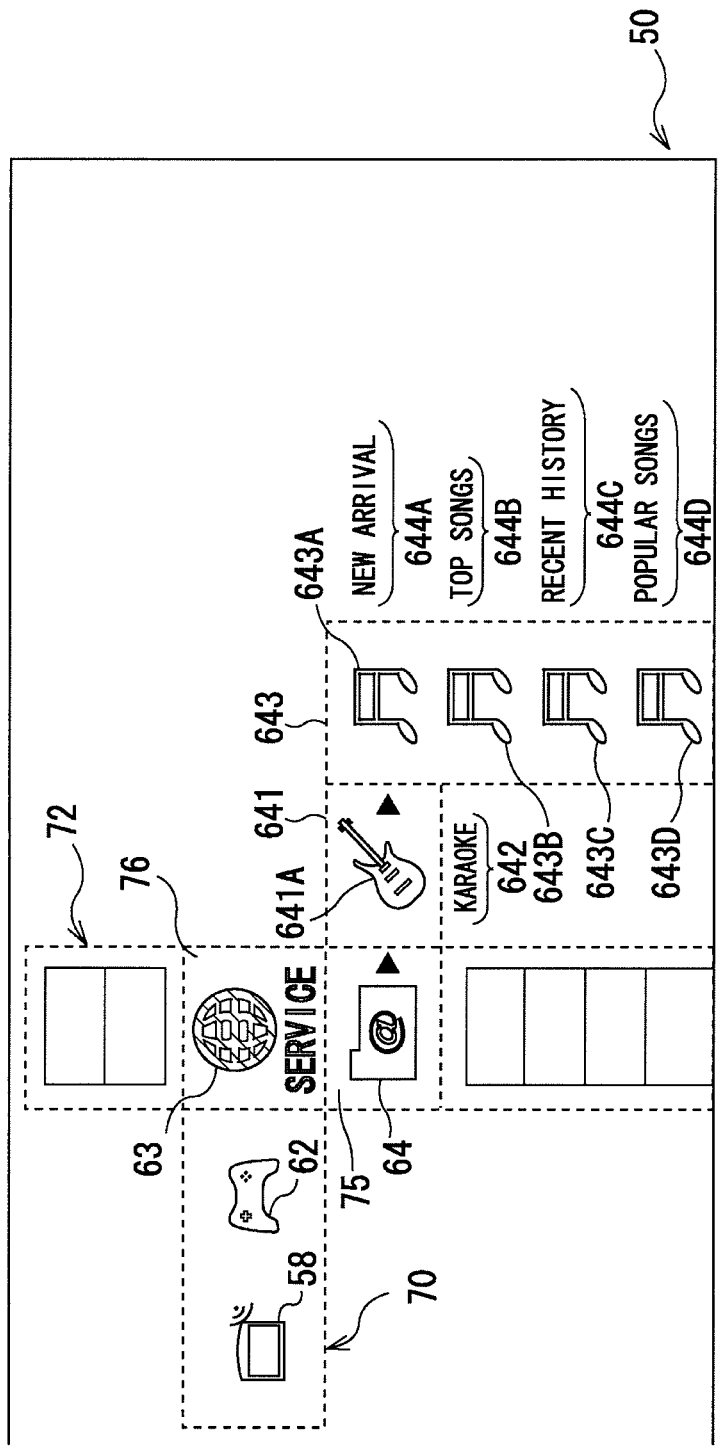
FIG. 4 is a diagram showing a structure of a menu screen generated by the multimedia reproduction apparatus according to this embodiment.

If the XML file which is stored in the URL described in the device XML is input to the aforementioned display control unit 48 via the network control unit 86, the display control unit 48 analyzes the contents of this XML file, and displays a menu screen on the display output unit 46 in accordance with analyzed results. For example, the menu screen 50 as shown in FIG. 4 is displayed. In this diagram, content icons indicating content classification names are displayed in two layers. More specifically, a content icon 641A symbolizing a classification of 'karaoke' is displayed in a region 641 to the right of the target region 75, and classification information 642 representing that classification name is displayed therebelow. Moreover, content icons 643A, 643B, 643C, and 643D symbolizing classifications belonging to the classification of 'karaoke' are displayed in a region 643 to the right of the region 641, and classification information 644A, 644B, 644C, and 644D representing that classification names are displayed to the right thereof, respectively. Note that in the case of the content classifications covering multiple layers, the number of layers of content icons displayed on the menu screen 50 may be limited to a predetermined number.

<Structure of Information Server>

The information server 37 includes a control unit, a storage unit, and a communication unit, which are all omitted from the drawing. The storage unit is stored with the aforementioned XML files and various types of contents. The information server 37 sends various types of XML files and the various types of contents stored in the storage unit to the multimedia reproduction apparatus 20 in response to a request from the multimedia reproduction apparatus 20.

(2) Operations

Figure 5:
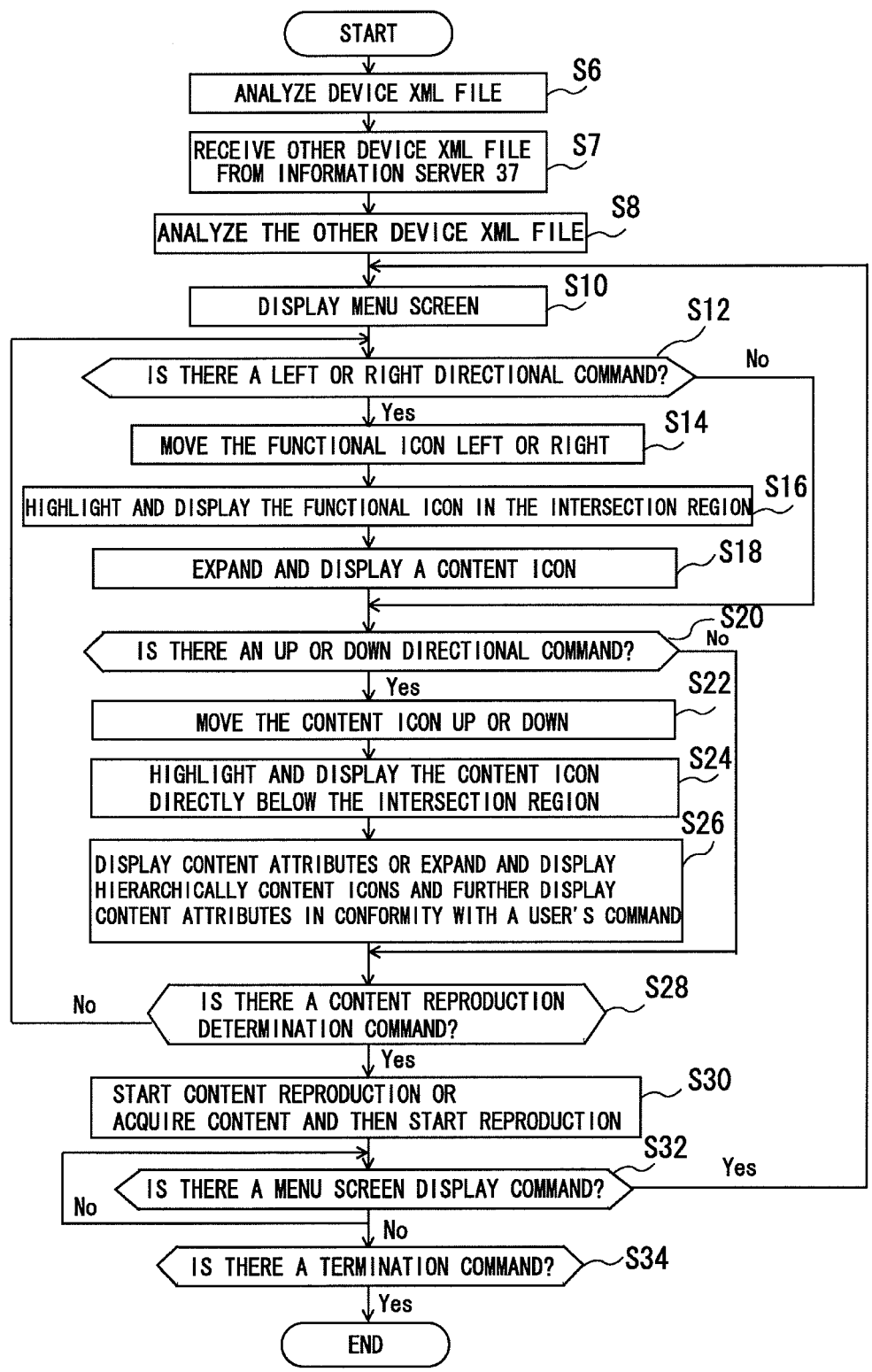
FIG. 5 is a flowchart showing an operation process of the multimedia reproduction apparatus according to this embodiment.

FIG. 5 is a flowchart showing an operation process of the multimedia reproduction apparatus 20. When a user turns on the multimedia reproduction apparatus 20, the display control unit 48 reads out the device XML file from the storage unit 80, analyzes the contents of that file (S6), and acquires the other device XML file stored in the URL described in that file via the network control unit 86 and the Internet 35 (S7) to store them in the storage unit 80. For example, when this URL indicates a storage place in the information server 37, the network control unit 86 accesses the information server 37 to acquire the other device XML file. The display control unit 48 analyzes the content of the other device XML file, and stores the content icon in the storage unit 80 based on the analysis result (S8). The image generation unit 110 acquires items such as various types of functional icons and content icons from the control unit 80, acquires the content icons from the storage unit 80 based on the analysis results in the aforementioned step S8, generates a menu screen, and the display output unit 46 displays it on the television receiver 30 (S10). When the operation unit 40 receives a directional command of either left or right from the user (S12: YES), the effect processing unit 108 moves the function icons either left or right in conformity with the command (S14), highlights the functional icon positioned in the intersection region 76 (S16), acquires the content icon corresponding to the reproduction function thereof from the storage unit 80, and expands it vertically (S18). Steps S14 to S18 are skipped when there is no left or right directional command from the user (S12: NO).

Figure 6:
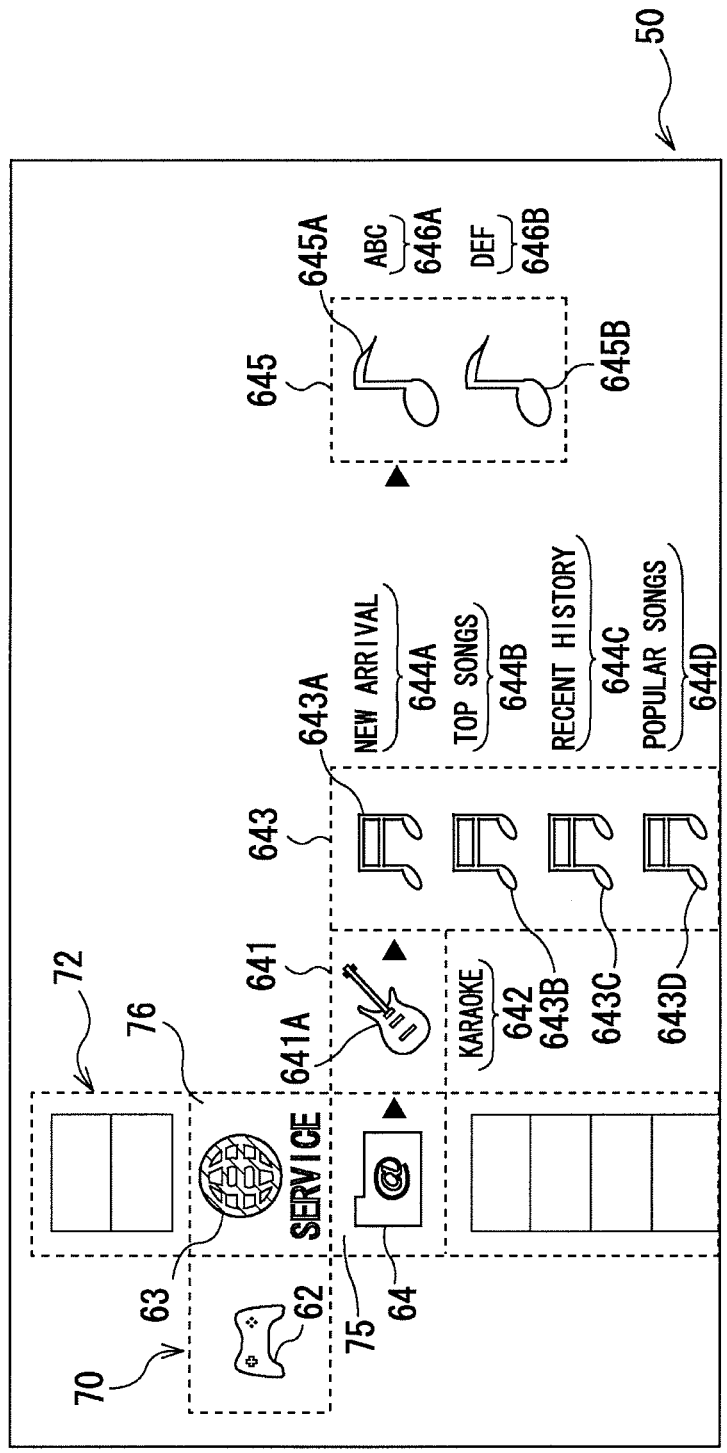
FIG. 6 is a diagram showing a structure of a menu screen generated by the multimedia reproduction apparatus according to this embodiment.

When the operation unit 40 receives a directional command of either up or down from the user (S20: YES), the effect processing unit 108 moves the content icons either up or down in conformity with the command (S22), and highlights the content icon positioned in the target region 75 directly below the intersection region 76 (S24). Moreover, when the functional icon positioned in the intersection region 76 is not the network icon 63, the content information 65 is displayed on the right side (S26). On the other hand, when the functional icon positioned in the intersection region 76 is the network icon 63, namely when the network icon 63 is selected, the content icons are expanded and displayed hierarchically as shown in FIG. 4. In this case, when any one of the hierarchically expanded and displayed content icons 643A, 643B, 643C, and 643D is selected according to a combination of a directional command of either up or down and directional command of either left or right, the content icon is highlighted as a target icon. Furthermore, as shown in FIG. 6, for example, a content icon indicating an item of the content belonging to the content classification which is indicated by that content icon (the content icon 643A in this case) is displayed in the region 645. In the same diagram, the content information 646A and 646B representing content names and the like is displayed to the right of the content icons 645A and 645B, respectively.

Steps S22 to S26 are skipped while there is no up or down command from the user (S20: NO).

The operation unit 40 repeats the processing of steps S12 to S26 until it receives a content reproduction determination command from the user (S28: NO), and once the operation unit 40 receives a content reproduction determination command (S28: YES), the content control unit 106 starts reproduction of the highlighted content in the target region 75 (S30) in the case where the functional icon positioned in the intersection region 76 is not the network icon 63. Note that when the functional icon positioned in the intersection region 76 is not the network icon 63, and the operation unit 40 has received a reproduction determination command for contents corresponding to the content icons (the content icons 646A and 646B in FIG. 6) which are expanded and hierarchically displayed corresponding to the network icon 63, the network control unit 86 acquires the contents based on the URL of the contents described in the aforementioned other device XML file, and the content control unit 106 starts reproduction of the contents.

When the operation unit 40 receives a menu screen call-up command from the user during content reproduction (S32: YES), processing jumps to step S10, repeating processing of steps S10 to S28 again. Content reproduction is continued if there is no menu screen call-up command from the user (S32: NO), and once the operation unit 40 receives a command to stop content reproduction from the user during content reproduction, the content control unit 106 stops the content reproduction (S34: YES).

In this manner, the multimedia reproduction apparatus 20 allows dramatic increase in reproducible contents by acquiring contents from the information server 37 via the Internet 35. Moreover, a variety of user interfaces may be provided to the user by receiving information or an XML file regarding the user interfaces from the information server 37 to provide reproducible contents.

Furthermore, the information server 37 appropriately updates the XML file to be provided to the multimedia reproduction apparatus 20, allowing dynamic information provision, and improvement in user convenience.

MODIFIED EXAMPLES

Modified Example 1

Note that the aforementioned device XML file may be stored in the storage unit 80 in plurality, or the URLs described in each of the device XML files may differ from each other. By analyzing the respective XML files, the multimedia reproduction apparatus 20 recognizes the respective URLs described in the respective XML files, and may acquire each of the other device XML files stored in storage places indicated by the respective URLs.

Modified Example 2

Moreover, in the embodiment given above, the network icon 63 as a functional icon and the content icons representing contents to be acquired via the Internet 35 have been defined in XML files. However, other functional icons and content icons may also be defined in XML files.

Furthermore, in the embodiment given above, the content acquired via the Internet 35 has been corresponded with the network icon 63. However, the content may also be corresponded to the functional icon of each type of content. In other words, for example, when the content acquired via the Internet 35 is music data, a content icon representing that content is expanded and displayed in the content icon array 72 when the music icon 54 is positioned in the intersection region 76.

Modified Example 3

Alternatively, billing may be carried out when acquiring content via the Internet 35. For example, when a content icon symbolizing a classification of the content acquired via the Internet 35 is positioned in the target region 75, and command for selecting one of content icons symbolizing items for contents belonging in that classification is received, an option menu is displayed in the menu screen in response to another command from the user. When billing is instructed in the option menu, data communication involving billing is carried out with a billing server (may be the information server 37) omitted from the drawing via the Internet 35, a structure allowing acquisition of the content from the information server 37 after billing is carried out is available.

Modified Example 4

Figure 7:
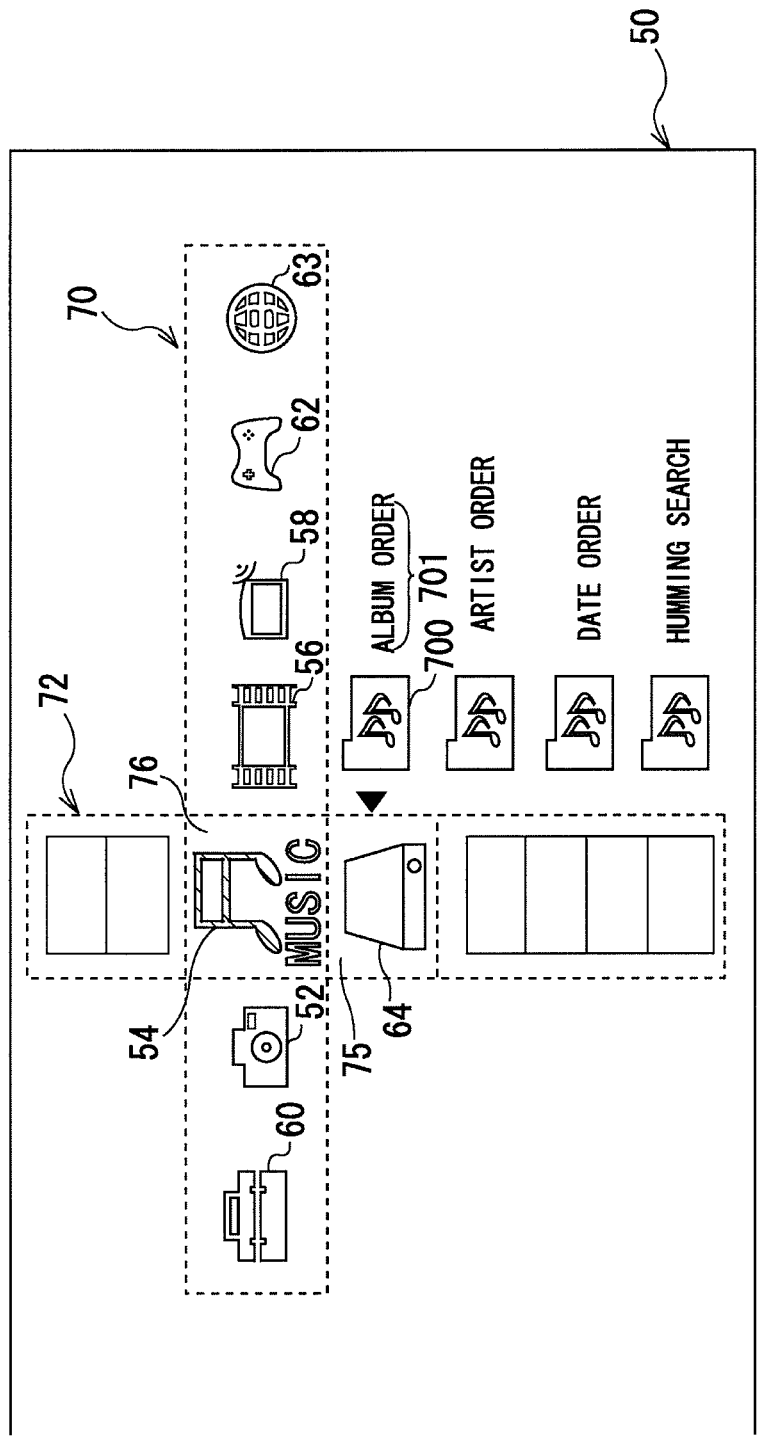
FIG. 7 is a diagram showing a structure of a menu screen generated by the multimedia reproduction apparatus according to this embodiment.

Further alternatively, the multimedia reproduction apparatus 20 may include a content browser. This content browser may classify contents corresponding to each of the reproduction functions, and expand and display icons symbolizing the content classifications based on the classification results. For example, in FIG. 7, the music icon 54 is positioned in the intersection region 76, and a storage device stored with music data and an icon symbolizing a storage medium are expanded and displayed in the content icon array 72. The storage device is a hard disk, for example, and the storage medium is the optical disk 36, the memory card 38, and similar media, for example. Then, when the icon symbolizing the storage device or the storage medium is positioned in the target region 75 directly below the intersection region 76, based on the classification results by the content browser, expands and displays the content icon 700, which symbolizes an item of the content belonging to the classification symbolized by the content icon, in the right direction, and displays classification name information 701 indicating a classification name of the content.

Modified Example 5

Yet further alternatively, the aforementioned various reproduction functions may be managed as widgets. Moreover, for example, not only the content acquired via the Internet 35, but information acquired via the Internet 35 related to the content stored in the memory card 38 or the optical disk 36 may also be displayed as content related information.

Figure 8:
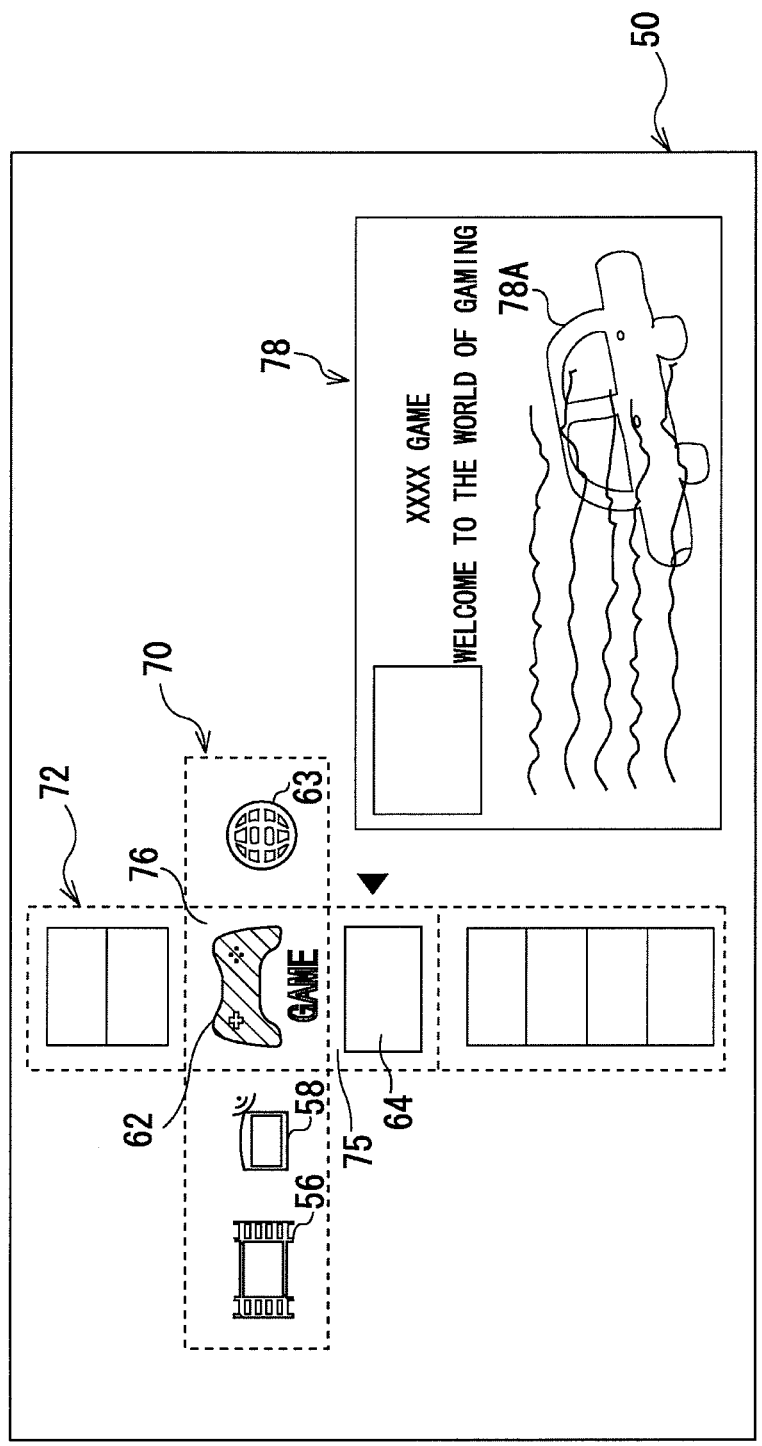
FIG. 8 is a diagram showing a structure of a menu screen generated by the multimedia reproduction apparatus according to this embodiment.

More specifically, for example, a browser image is displayed as the target icon 64 instead of displaying the content information 65. For example, when this content icon is an icon symbolizing a game program, the content related information such as a summary of a game to be executed according to this game program is displayed in the browser image 78. This content related information may correspond to the game and be stored in advance in the storage unit 80, or may be acquired from a predetermined URL linked in advance to the game program via the Internet 35. The content related information may include information indicating score order of the game, or degree of recommendation, for example, in addition to the information representing a summary of the game. The image generation unit 110 generates such browser image, and the display output unit 46 displays it on the television receiver 30. For example, in the menu screen shown in FIG. 8, the browser image 78 is displayed to the right of the content icon positioned in the target region 75 directly below the intersection region 76.

Note that when the network control unit 86 detects that the multimedia reproduction apparatus 20 is not connectable to the Internet 35, the information to be displayed in the browser image 78 may be limited to information stored in advance in the storage unit 80. Moreover, it may be structured such that the information is displayed in the browser image 78 over several pages, where the information stored in advance in the storage unit 80 is displayed on the first page, and the information acquired via the Internet 35 is displayed on the second and subsequent pages.

Furthermore, a structure allowing turning of the pages of information displayed in the browser image 78, and performing an operation such as scrolling via the controller 42 is available. In this case, operations within the browser image 78 (hereafter referred to as browser operations) and operations related to selection of a content icon or functional icon or content reproduction in the aforementioned menu screen 50 (hereafter referred to as menu operation) may be switched over in the following manner. Namely, corresponding operation of the controller 42 either to a browser operation or a menu operation may be switched over in the following manner. The user switches over by performing a predetermined operation of the controller 42. Alternatively, in the case of displaying a pointer to be moved in conformity with operation of the controller 42, when it is detected that the moved position of the pointer is outside of the browser image 78, an operation of the controller 42 is automatically switched over to a menu operation.

Moreover, a part of or all within the browser image 78 may be made transparent or translucent, and a background image of the browser image 78 displayed overlapping the transparent or translucent portion. Furthermore, the form of the portion to be made transparent may be various forms. For example, making just an image 78A within the browser image 78 be transparent is possible. Specification of transparent color within the browser image 78 and form thereof may be stored in advance in the storage unit 80, or may be acquired from the information server 37.

Moreover, when acquiring the information from the information server 37, character font of the information to be displayed within the browser image 78 may comply with the capability of the television receiver 30. Namely, in the case where the television receiver 30 has a Hi-vision capability, information specifying the character font which complies with that capability is provided by the information server 37, and in the case where the television receiver 30 has a standard capability, information specifying the character font which complies with that capability is provided by the information server 37.

Modified Example 6

Figure 9:
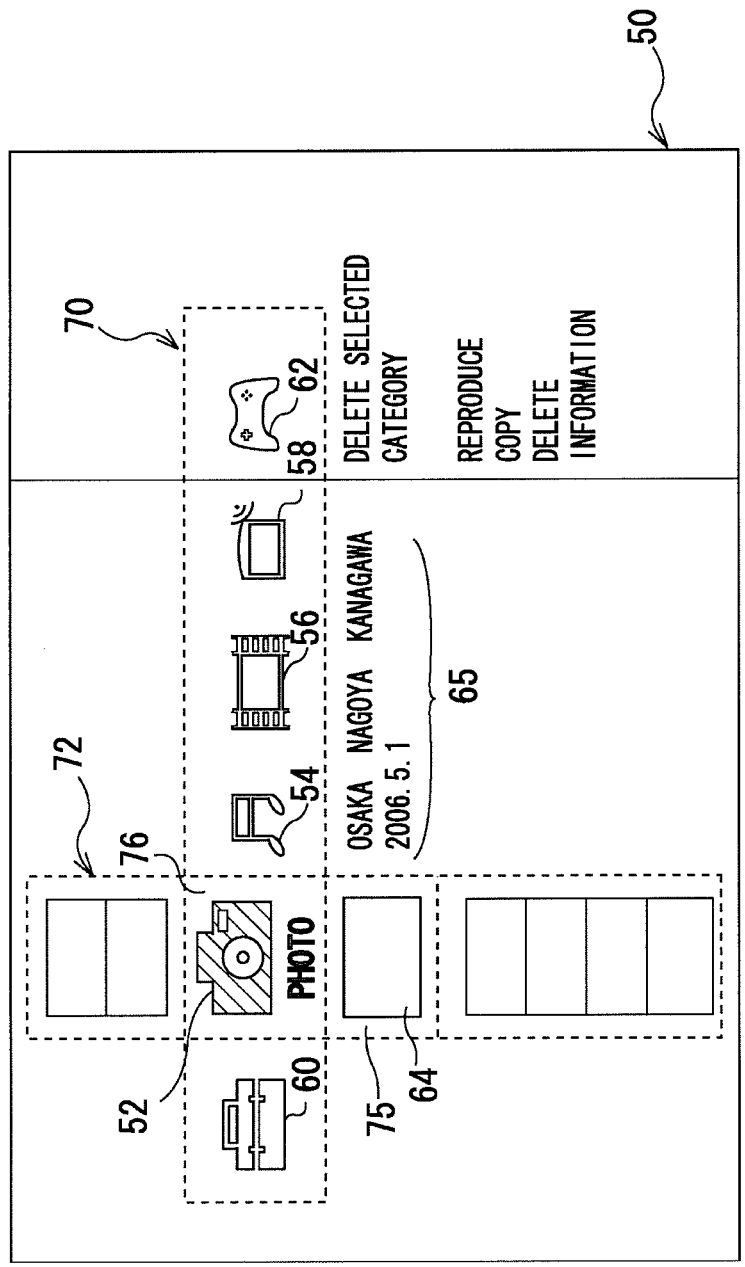
FIG. 9 is a diagram showing a structure of a menu screen reproduced by the multimedia reproduction apparatus according to this embodiment.
Figure 10:
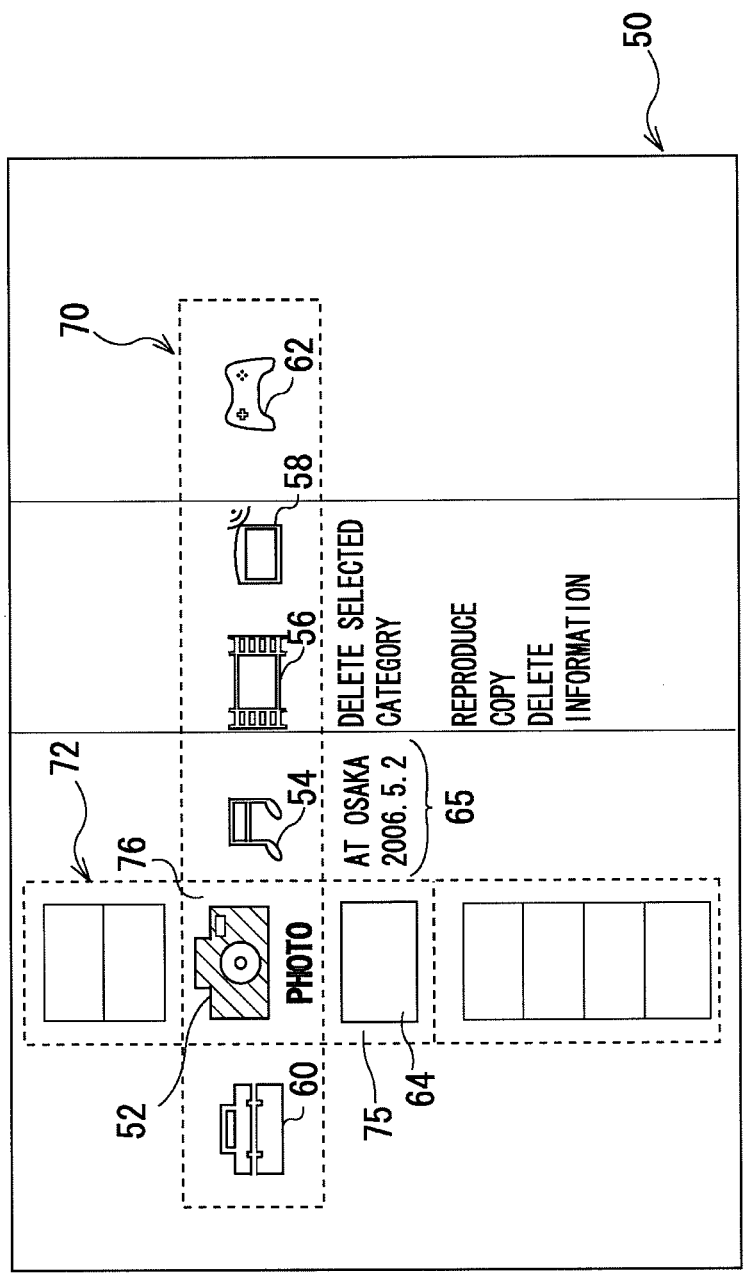
FIG. 10 is a diagram showing a structure of a menu screen generated by the multimedia reproduction apparatus according to this embodiment.

Alternatively, in the case where, for example, an option menu is displayed on the right side of the menu screen 50 when the operation unit 40 has received a predetermined command from the user, the display region for the image of this option menu may be varied in accordance with the number of characters in the content information 65. The option menu is for the user to command to delete an image, change image name, copy the image or the like when, for example, the content is a static image. More specifically, for example, when the number of characters in the content information 65 is less than a predetermined number, the image of the option menu is displayed to the right near the end of the characters representing the content information, as shown in FIG. 9, and when the number of characters in the content information 65 is more than a predetermined number, the image of the option menu is displayed in a predetermined region in the right end of the menu screen, as shown in FIG. 10.

Modified Example 7

Note that the aforementioned multimedia reproduction apparatus 20 may be connectable to a network other than the Internet 35. With this kind of structure, the multimedia reproduction apparatus 20 controls to acquire content from an external device such as digital consumer electronics connected to the network, display a content icon related to the content on the aforementioned menu screen, and reproduce the content in conformity with an operation in the menu screen.

Modified Example 8

Note that with the aforementioned multimedia reproduction apparatus 20, the television receiver 30 functioning as a display means and the controller functioning as an operation means are each provided as a separate device from the apparatus main frame. However, the multimedia reproduction apparatus 20 according to the present invention may be structured with a display means or an operation means integrated with the apparatus main frame, or it may be structured as a portable apparatus.

The descriptions of the respective embodiments given above are merely examples of the present invention. Therefore, the present invention is not limited to the respective embodiments given above, and it is needless to say that other various changes may be made without departing from the technical spirit or scope of the present invention.

INDUSTRIAL APPLICABILITY

The present invention employs a multimedia reproduction system, which displays a menu screen with multiple function icons symbolizing types of content reproduction functions and multiple content icons symbolizing content items in a two-dimensional array, which is favorable.

The invention claimed is:
1. A multimedia reproduction apparatus, which is capable of reproducing contents; said multimedia reproduction apparatus comprising:

an operation unit, which receives a command regarding content reproduction via an operation by a user;

a storage unit, which is stored with data of a plurality of functional icons symbolizing types of content reproduction functions, a content to be reproduced by the apparatus, and data of a plurality of content icons symbolizing items for contents;

a network control unit, which accesses an external device via a network to acquire from the external device, content classification information indicating classifications of contents to be reproduced and items for the classified contents;

a display output unit, which outputs image data of a menu screen related to reproduction of the content to a display device, and reproduces the content acquired from either the storage unit or the network control unit in conformity with a command from the user received by the operation unit; and a display control unit, which generates image data of the menu screen with a two-dimensional array including a first array in which the plurality of functional icons is lined up in a specified direction on a screen, and a second array in which the plurality of content icons are lined up in a direction intersecting the first array on the screen, wherein the network control unit acquires content classification information of contents to be reproduced from the external device via the network, before acquiring the contents to be reproduced via the network, when of the plurality of reproduction functions, a reproduction function of a content acquired from the external device has been selected in conformity with a command from the user received by the operation unit, the display control unit analyzes the content classification information of the contents to be reproduced acquired by the network control unit via the network before acquiring the contents to be reproduced, classifies the content acquired from the external device, displays a content classification icon symbolizing that classification as the content icon on the menu screen, while when the content classification icon is selected in conformity with a command from the user received by the operation unit, the display control unit displays the content icon symbolizing a content item belonging to that classification on the menu screen.

2. The multimedia reproduction apparatus of claim 1, wherein the storage unit is stored with storage place information indicating a storage place for the content classification information, the network control unit accesses the external device to acquire the content classification information using the storage place information.

3. The multimedia reproduction apparatus of claim 2, wherein the content classification information indicates a storage place of the content, the network control unit acquires the content from the storage place indicated in the content classification information in conformity with a reproduction command from the user received by the operation unit, and the display output unit reproduces the content acquired by the network control unit.

4. The multimedia reproduction apparatus of any one of claim 1, wherein the content classification information gives the classifications of the contents hierarchically, and the display control unit analyzes the content classification information, and displays content classification icons symbolizing the classifications and content icons symbolizing items of contents belonging to the classifications on the menu screen hierarchically.

5. A multimedia reproduction apparatus, which is capable of reproducing contents; said multimedia reproduction apparatus comprising:

an operation unit, which receives a command regarding content reproduction via an operation by a user;

a storage unit, which is stored with data of a plurality of functional icons symbolizing types of content reproduction functions, contents to be reproduced by the apparatus, and data of a plurality of content icons symbolizing content items;

a network control unit, which access an external device via a network to acquire from the external device content related information involving content to be reproduced;

a display output unit, which outputs image data of a menu screen related to reproduction of the content to a display device, and reproduces the content acquired from the storage unit in conformity with a command from the user received by the operation unit; and a display control unit, which generates image data of the menu screen with a two-dimensional array including a first array in which the plurality of functional icons is lined up in a specified direction on a screen, and a second array in which the plurality of content icons are lined up in a direction intersecting the first array on the screen, wherein the content related information includes at least one of information representing content of the content, representing level of recommendation of the content, introducing other content related to the content, and representing an arbitrary comment by a user regarding the content, the information representing content of the content includes a thumbnail of the content, and when any one of the plurality of content icons has been selected in conformity with a command from the user received by the operation unit, the display control unit displays the content icon symbolizing a content item acquired from the storage unit and content related information regarding the content acquired by the network control unit on the menu screen.

6. The multimedia reproduction apparatus of claim 5, wherein the network control unit acquires content to be reproduced and an item for the content from the external device, and when any one of the plurality of content icons has been selected in conformity with a command from the user received by the operation unit, the display control unit displays the content icon symbolizing a content item acquired by the network control unit and content related information regarding the content acquired by the network control unit on the menu screen.

7. A method of displaying a menu screen in an apparatus capable of reproducing contents; said method comprising the steps of:

reading out data of a plurality of functional icons symbolizing types of content reproduction functions, content to be reproduced by the apparatus, and data of a plurality of content icons symbolizing content items;

accessing an external device via a network to acquire from the external device, content classification information indicating classifications of contents to be reproduced and items for the classified contents;

generating image data of the menu screen with a two-dimensional array including a first array in which the plurality of functional icons is lined up in a specified direction on a screen, and a second array in which the plurality of content icons are lined up in a direction intersecting the first array on the screen, and outputting the image data of the menu screen to the display device, wherein in the generating step, when of the plurality of reproduction functions, a reproduction function of a content acquired from the external device has been selected in conformity with a command from the user, the content classification information acquired via the network in the acquiring step is analyzed, the content acquired from the external device is classified, and image data of the content icon symbolizing a content classification item belonging to that classification arranged on the menu screen is generated, while when the content classification icon is selected in conformity with a command from the user received by the operation unit, image data of the content icon symbolizing a content item belonging to that classification arranged on the menu screen is generated, and the content classification information acquired via the network in the accessing step is accessed prior to the content acquired from the external device in the accessing step.

8. A method of displaying a menu screen in an apparatus capable of reproducing contents; said method comprising the steps of:

reading out data of a plurality of functional icons symbolizing types of content reproduction functions, content to be reproduced by the apparatus, and data of a plurality of content icons symbolizing content items;

accessing an external device via a network to acquire from the external device content related information involving content to be reproduced, wherein the content related information includes at least one of information representing content of the content, representing level of recommendation of the content, introducing other content related to the content, and representing an arbitrary comment by a user regarding the content, and the information representing content of the content includes a thumbnail of the content, and;

generating image data of the menu screen with a two-dimensional array including a first array in which the plurality of functional icons is lined up in a specified direction on a screen, and a second array in which the plurality of content icons are lined up in a direction intersecting the first array on the screen, and outputting the image data of the menu screen to the display device, wherein in the generating step, when any one of the plurality of content icons has selected in conformity with a command from the user, image data representing the content icon symbolizing the content item read out in the read-out step and content related information regarding the content acquired in the acquiring step on the menu screen is generated.

9. A menu screen display program, which is executed by a computer including an apparatus capable of reproducing contents; said menu screen display program comprising the steps of:

reading out data of a plurality of functional icons symbolizing types of content reproduction functions, content to be reproduced by the apparatus, and data of a plurality of content icons symbolizing content items;

accessing an external device via a network to acquire from the external device, content classification information indicating classifications of contents to be reproduced and items for the classified contents;

generating image data of the menu screen with a two-dimensional array including a first array in which the plurality of functional icons is lined up in a specified direction on a screen, and a second array in which the plurality of content icons are lined up in a direction intersecting the first array on the screen, and outputting the image data of the menu screen to the display device, wherein in the generating step, when of the plurality of reproduction functions, has selected a reproduction function of a content acquired from the external device has been selected in conformity with a command from the user, the content classification information acquired via the network in the acquiring step is analyzed, the content acquired from the external device is classified, image data of the content icon symbolizing a content classification item belonging to that classification arranged on the menu screen is generated, while when the content classification icon has been selected in conformity with a command from the user received by the operation unit, image data of the content icon symbolizing a content item belonging to that classification arranged on the menu screen is generated, and the content classification information acquired via the network in the accessing step is accessed prior to the content acquired from the external device in the accessing step.

10. A menu screen display program, which is executed by a computer including an apparatus capable of reproducing contents; said menu screen display program comprising the steps of:

reading out data of a plurality of functional icons symbolizing types of content reproduction functions, content to be reproduced by the apparatus, and data of a plurality of content icons symbolizing content items;

accessing an external device via a network to acquire from the external device content related information involving content to be reproduced, wherein the content related information includes at least one of information representing content of the content, representing level of recommendation of the content, introducing other content related to the content, and representing an arbitrary comment by a user regarding the content, and the information representing content of the content includes a thumbnail of the content, and;

generating image data of the menu screen with a two-dimensional array including a first array in which the plurality of functional icons is lined up in a specified direction on a screen, and a second array in which the plurality of content icons are lined up in a direction intersecting the first array on the screen, and outputting the image data of the menu screen to the display device, wherein in the generating step, when any one of the plurality of content icons has been selected in conformity with a command from the user, image data representing the content icon symbolizing the content item read out in the read-out step and content related information regarding the content acquired in the acquiring step on the menu screen is generated.

11. A computer readable storage medium stored with the menu screen display program of either claim 9.

* * * * *